(12) United States Patent
Maurice Mory et al.

(10) Patent No.: US 12,340,464 B2
(45) Date of Patent: Jun. 24, 2025

(54) RENDERING OF TWO DIMENSIONAL DATA SETS

(71) Applicant: KONINKLIJKE PHILIPS N.V., Eindhoven (NL)

(72) Inventors: Benoit Jean-Dominique Bertrand Maurice Mory, Medford, MA (US); Francois Guy Gerard Marie Vignon, Andover, MA (US); Emmanuel Mocé Serge Attia, Paris (FR); Jean-Michel Rouet, Paris (FR); Maxim Fradkin, Maisons-Laffitte (FR)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 170 days.

(21) Appl. No.: 18/021,682

(22) PCT Filed: Aug. 19, 2021

(86) PCT No.: PCT/EP2021/072981
§ 371 (c)(1),
(2) Date: Feb. 16, 2023

(87) PCT Pub. No.: WO2022/038208
PCT Pub. Date: Feb. 24, 2022

(65) Prior Publication Data
US 2023/0316642 A1    Oct. 5, 2023

(30) Foreign Application Priority Data
Aug. 20, 2020 (EP) ..................................... 20290062

(51) Int. Cl.
*G06T 17/00* (2006.01)
*G06T 15/10* (2011.01)
(Continued)

(52) U.S. Cl.
CPC .............. *G06T 17/00* (2013.01); *G06T 15/10* (2013.01); *G06T 15/20* (2013.01); *G06T 15/50* (2013.01)

(58) Field of Classification Search
CPC ..... G06T 17/00; G06T 17/205; G06T 15/005; G06T 15/10; G06T 15/20; G06T 15/50;
(Continued)

(56) References Cited

U.S. PATENT DOCUMENTS 6,443,896 B1   9/2002 Detmer
6,530,885 B1   3/2003 Entrekin et al.
(Continued)

FOREIGN PATENT DOCUMENTS

EP    1566769 A2    8/2005

OTHER PUBLICATIONS

International Search Report and Written Opinion for PCT/EP2021/072981; Mailing date: Dec. 7, 2021, 12 pages.
(Continued)

*Primary Examiner* — Vijay Shankar

(57) ABSTRACT

In some examples, two dimensional (2D) datasets, such as images, may be transformed into three dimensional (3D) datasets (e.g., volumes). The values and material properties of voxels of the 3D dataset may be based, at least in part, on values of pixels in the 2D dataset. A 3D scene of the 3D dataset may be rendered from a plane parallel to a plane of the 2D dataset to generate a "top-down" render that may look like a 2D image. In some examples, additional coloring may be added to the rendered 2D image based on intensity or other properties of the 2D dataset.

14 Claims, 12 Drawing Sheets

(51) Int. Cl.
  *G06T 15/20* (2011.01)
  *G06T 15/50* (2011.01)
(58) Field of Classification Search
  CPC ... G06T 15/205; G06T 15/08; G01S 7/52071; G01S 15/8925; G01S 15/8993
  See application file for complete search history.

(56) References Cited

U.S. PATENT DOCUMENTS

| | | | | |
|---|---|---|---|---|
| 7,640,050 | B2* | 12/2009 | Glenn, Jr. | G06T 19/00 600/407 |
| 8,145,292 | B2* | 3/2012 | Vining | G06T 7/155 600/407 |
| 11,562,530 | B2* | 1/2023 | Hamilton | G06T 15/08 |
| 11,869,138 | B2* | 1/2024 | Hamilton | G06T 15/06 |
| 2014/0232719 | A1 | 8/2014 | Wahrenberg | |
| 2021/0335031 | A1* | 10/2021 | Hamilton | G06T 15/08 |

OTHER PUBLICATIONS

Anonymous; "Heightmap", Retrieved from https://en.wikipedia.org/w/index.php?title=Heightmap&oldid=955619581, 2020, 3 pages.
Hartl, A. et al., "Rapid reconstruction of small objects on mobile phones", Computer Vision and Pattern Recognition Workshops (CVPRW), IEEE Computer Society Conference, 2011, pp. 20-27.
Heitz, E. et al., "Filtering color mapped textures and surfaces", Proceedings of the ACM SIGGRAPH Symposium on Interactive 3D Graphics and Games, 2013, pp. 129-136.

\* cited by examiner

RENDERING OF TWO DIMENSIONAL DATA SETS

CROSS-REFERENCE TO PRIOR APPLICATIONS

This application is the U.S. National Phase application under 35 U.S.C. § 371 of International Application No. PCT/EP2021/072981, filed on Aug. 19, 2021, which claims the benefit of European Patent Application No. 20290062.7, filed on Aug. 20, 2020. These applications are hereby incorporated by reference herein.

TECHNICAL FIELD

This application relates to generating two dimensional images. More specifically, this application relates to applying three dimensional rendering techniques to two dimensional data sets.

BACKGROUND

It is often difficult for reviewers of medical images to perceive depth in medical images. This may be due to a lack of a familiar reference point for determining relative distances and/or lack of reflections and shadows when the image was not acquired with a light source (e.g., x-rays, ultrasound waves). In some types of medical imaging, photo-realistic rendering may be used which applies physically-based ray-tracing algorithms to generate a two dimensional (2D) projection of a three dimensional (3D) (e.g., volumetric) dataset. The photo-realistic rendering may apply one or more virtual light sources to the 3D dataset, simulating shadows and reflections. These virtual lighting effects may improve depth perception. However, photo-realistic rendering only works with volumetric datasets or surface meshes obtained from 3D acquisitions. It does not bring any benefit to conventional 2D imaging. Despite advances in 3D imaging, many reviewers (e.g., radiologists, surgeons) still prefer to view 2D images rather than 3D renders. Accordingly, it may be desirable to provide enhanced depth perception to 2D images.

SUMMARY

Examples of post-processing techniques to simulate 3D photo-realistic rendering without the need for a 3D volumetric image data set are disclosed herein. Depth perception may be added to 2D images and structures may be enhanced with lighting effects. As disclosed herein, a transformation of a 2D image to a 3D volumetric representation of density voxels may be performed. Material properties such as absorption and scattering may be assigned to each voxel. A 3D scene with at least one light source from a viewer position looking down to the image may be rendered. Optionally, color-mapping of the voxels may be performed to add coloration according to depth and/or intensity.

In accordance with at least one example disclosed herein, an apparatus may include a processor configured to transform a two dimensional (2D) dataset comprising a plurality of pixels into a three dimensional (3D) dataset comprising a plurality of voxels, wherein a plane of the 2D dataset includes a number of voxels of the plurality of voxels corresponding to the plurality of pixels and wherein the plurality of voxels includes additional voxels located out of the plane of the 2D dataset to define a height dimension of the 3D dataset, assign material properties to the plurality of voxels, and render a 3D scene of the 3D dataset from a viewing plane parallel to the plane of the 2D dataset, wherein rendering simulates at least one virtual light source propagated through the 3D dataset and propagation of the virtual light source through the 3D dataset is based, at least in part, on the material properties assigned to the plurality of voxels.

In some example, the apparatus further comprising an ultrasound probe configured to acquire ultrasound signals from a subject, wherein the 2D dataset is generated from the ultrasound signals.

In some example, a location of the simulated light source is based, at least in part, on a location of the ultrasound probe relative to a location where the ultrasound signals were acquired.

In some example, the processor is further configured to assign color values to the plurality of voxels based, at least in part, on a distance from a voxel to the viewing plane.

In some example, the apparatus further comprising a user interface configured to receive a user input that determines a location of the virtual light source relative to the 3D dataset.

In accordance with at least one example disclosed herein, a method may include transforming a two dimensional (2D) dataset comprising a plurality of pixels into a three dimensional (3D) dataset comprising a plurality of voxels, wherein a plane of the 2D dataset includes a number of voxels of the plurality of voxels corresponding to the plurality of pixels and wherein the plurality of voxels includes additional voxels located out of the plane of the 2D dataset to define a height dimension of the 3D dataset, assigning material properties to the plurality of voxels, and rendering a 3D scene of the 3D dataset from a viewing plane parallel to the plane of the 2D dataset, wherein rendering comprises simulating at least one virtual light source propagated through the 3D dataset and propagation of the virtual light source through the 3D dataset is based, at least in part, on the material properties assigned to the plurality of voxels.

In some example, the height dimension is based, at least in part, on intensity values of the plurality of pixels.

In some example, assigning material properties comprises defining at least one transfer function for at least one material property.

In some example, the transfer function comprises a threshold value, wherein voxels of the plurality of voxels having a value below the threshold value are rendered as transparent for the at least one material property.

In some example, the material property includes at least one of density, absorption, reflectance, or scattering.

In some example, at least one of the material properties is wavelength-dependent.

In some example, the 2D dataset is a multichannel dataset, wherein different material properties of the plurality of voxels are each based on values from a different channel of the multichannel dataset.

In some example, the method further comprising assigning color values to the plurality of voxels based, at least in part, on a distance from a voxel to the viewing plane.

In some example, transforming the 2D dataset into the 3D dataset comprises assigning binary values to the plurality of voxels.

In some example, transforming the 2D dataset into the 3D dataset comprises assigning values to the plurality of voxels based, at least in part, on intensity values of the plurality of pixels.

In some example, the values assigned to the plurality of voxels decay with height.

In some example, the plurality of pixels of the 2D dataset comprises a first plurality of pixels and a second plurality of pixels and the plurality of voxels of the 3D dataset comprise a first plurality of voxels corresponding to the first plurality of pixels and a second plurality of voxels corresponding to the second plurality of pixels, wherein the first plurality of pixels and the second plurality of pixels correspond to first and second 2D images, respectively.

In some example, material properties of the first plurality of voxels are assigned independently of material properties of the second plurality of voxels.

In some example, the first plurality of voxels is rendered separately from the second plurality of voxels to generate first and second 3D scenes, respectively, wherein the first and second 3D scenes are combined to provide the 3D scene.

In some example, the first 2D image is acquired from a first imaging mode and the second 2D image is acquired from a second imaging mode different from the first imaging mode.

DESCRIPTION

Figure 1A:
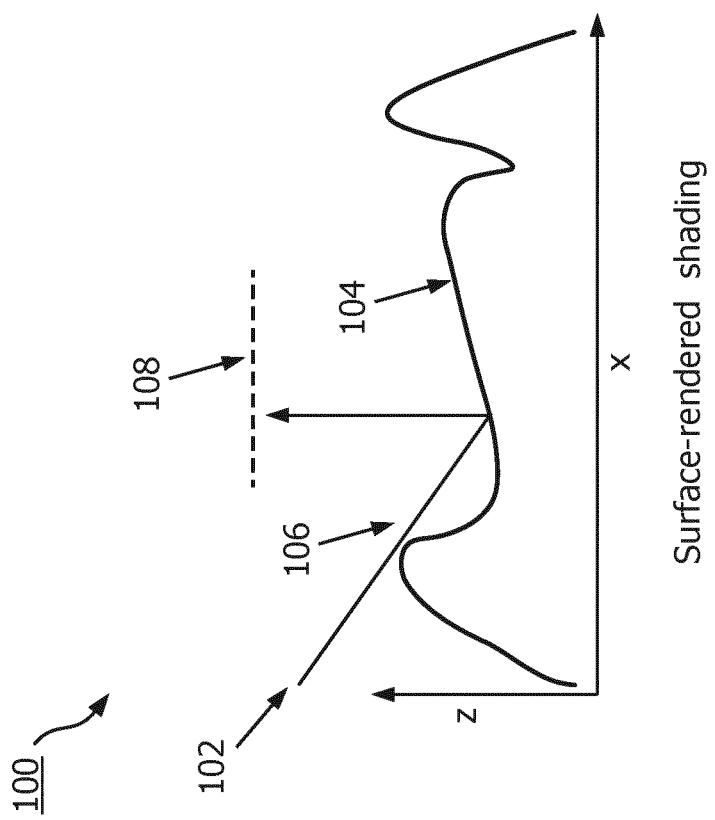
FIG. 1A is an illustration of existing two dimensional (2D) shading.

The following description of certain exemplary examples is merely exemplary in nature and is in no way intended to limit the disclosure or its applications or uses. In the following detailed description of examples of the present apparatuses, systems and methods, reference is made to the accompanying drawings which form a part hereof, and in which are shown by way of illustration specific examples in which the described apparatuses, systems and methods may be practiced. These examples are described in sufficient detail to enable those skilled in the art to practice the presently disclosed apparatuses, systems and methods, and it is to be understood that other examples may be utilized and that structural and logical changes may be made without departing from the spirit and scope of the present disclosure. Moreover, for the purpose of clarity, detailed descriptions of certain features will not be discussed when they would be apparent to those with skill in the art so as not to obscure the description of the present disclosure. The following detailed description is therefore not to be taken in a limiting sense, and the scope of the present systems and methods is defined only by the appended claims.

Users of medical imaging systems, such as radiologists, surgeons, and sonographers, often still feel more comfortable making decisions based on two dimensional (2D) images compared to three dimensional (3D) renders. However, 2D medical images typically provide few or no visual cues to aid viewers with depth perception. Some post-processing image enhancement methods use local illumination shading to artificially add depth perception to 2D images. A well-known example is the emboss filter.

Applying local illumination shading to 2D images includes interpreting image brightness values as height measurements of a 3D surface. Adding ambient, diffuse and specular reflection effects to the surface provides a better perception of shape. By delineating local image features, virtual lighting can create more pronounced contours and a better separation of objects. Existing 2D shading uses local, gradient-based surface illumination. In other words, a rate of change in the value of pixel intensity in one or more directions in the 2D image may be used to determine shading. However, existing 2D shading suffers several limitations. For example, shading requires the input surface to be smooth, hence shading cannot be directly applied to high-frequency textured content like grainy ultrasound images. Furthermore, no global effects like shadows or volumetric scattering are considered, which limits the added perceived contrast. Accordingly, improved depth perception in 2D images may be desirable.

According to examples of the present disclosure, a 2D data set is transformed into a 3D dataset. The 3D dataset may be a volumetric representation of density voxels. Material properties (e.g., absorption, scattering) may be assigned to each voxel in the 3D dataset. A 3D scene may be rendered from the 3D dataset with at least one light source. The rendering may be from a viewer position looking down on the 3D dataset. The rendering from this perspective may provide the appearance of a 2D image to the viewer (as opposed to the appearance of a volume as with conventional renders of 3D data sets). Thus, the 3D scene may also be referred to as a rendered 2D image or a "look-down render." Optionally, in some examples, the voxels in the 3D dataset may be assigned colors based on the depth and/or intensity value of the voxels.

In some applications, the assignment of material properties and volumetric rendering may provide improved depth perception and contrast in the rendered 2D image compared to a 2D image enhanced with conventional local surface illumination techniques.

Figure 1B:
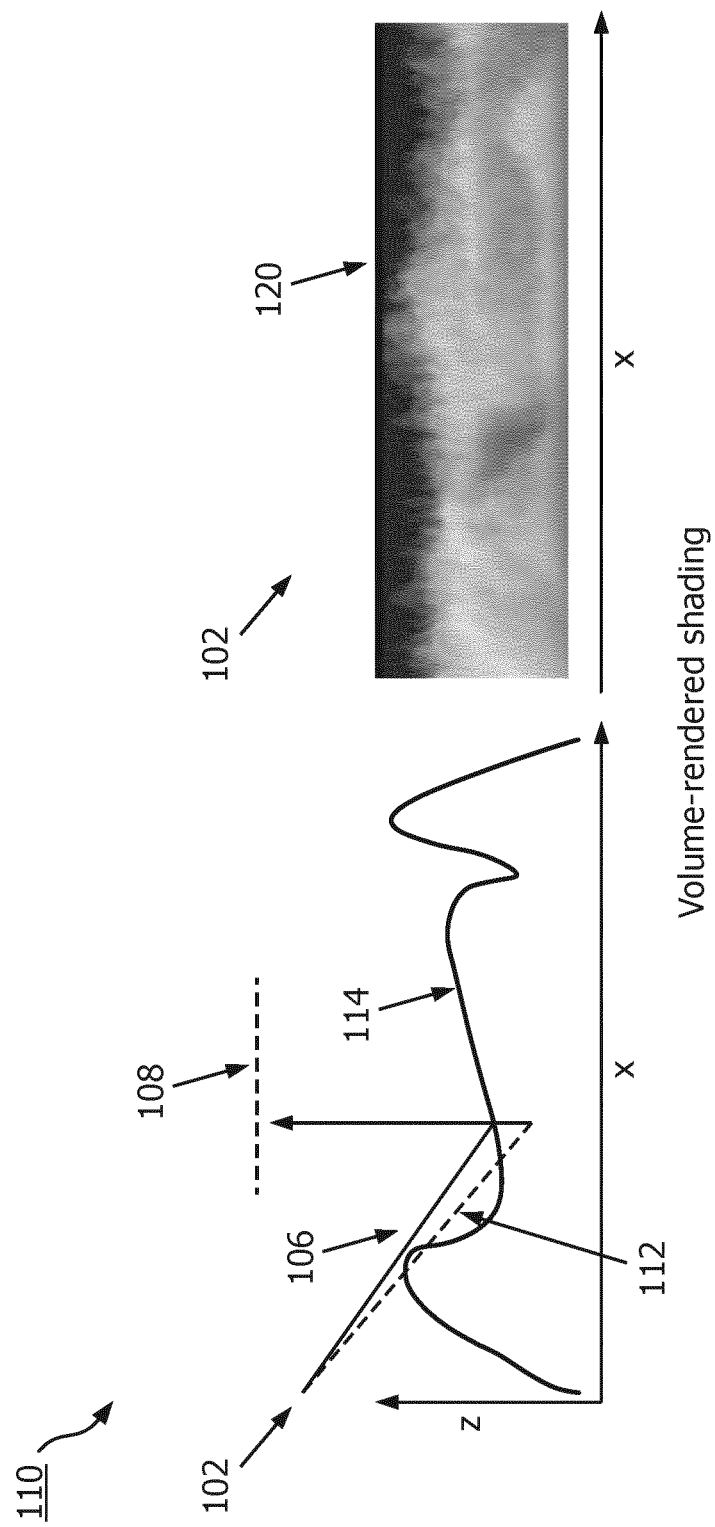
FIG. 1B is an illustration of volumetric rendering of 2D images in accordance with examples of the present disclosure.

FIGS. 1A and 1B illustrate differences between existing 2D shading and volumetric rendering of 2D images in accordance with examples of the present disclosure. In FIG. 1A, plot 100 shows an example cross-section of a solid surface 104 plotted as height (z) versus distance (x) illuminated by a light source 102. Existing methods may use gradients (e.g., rates of change) of pixel intensity values or merely pixel intensity values of a 2D image to simulate the height of the solid surface 104. The light source 102 is then projected on the solid surface 104 as rays 106, and the rays 106 reflected off the solid surface 104 to a viewing plane 108 are used to generate a shaded 2D image.

In FIG. 1B, plot 110 shows a cross-section of a volume 114 plotted as height (z) versus distance (x) illuminated by the light source 102 in accordance with examples of the present disclosure. Unlike solid surface 104 in FIG. 1A, the volume 114 may be made of a voxel grid that can be filled with values that are non-binary. These non-binary values may define material properties of the voxels. The material properties may determine how light interacts with the volume 114 and/or determine the appearance of the volume 114. As shown in plot 110, some rays, such as ray 112 projected from the light source 102 may pass (at least partially) through portions of the volume 114 prior to being reflected from the volume 114 rather than only reflecting off the surface, such as ray 106. This may provide more realistic shadowing, which may improve contrast by darkening areas surrounding high intensity regions of the 2D image. In some examples, some of the rays, such as ray 112 may be partially absorbed by the volume 114. When this light penetration, absorption, and/or scattering is not equal across the spectrum (e.g., different absorption coefficients for red, green, and blue), gray-valued scalar 2D images may be converted into color images by the rendering.

In some applications, the volume 114 may be less dependent on local gradients compared to 2D surface shading techniques, which allows the technique to be used on textured, non-smooth images. An example of a rendered volume from a non-smooth 2D image is shown in plot 120 of FIG. 1B.

Figure 2:
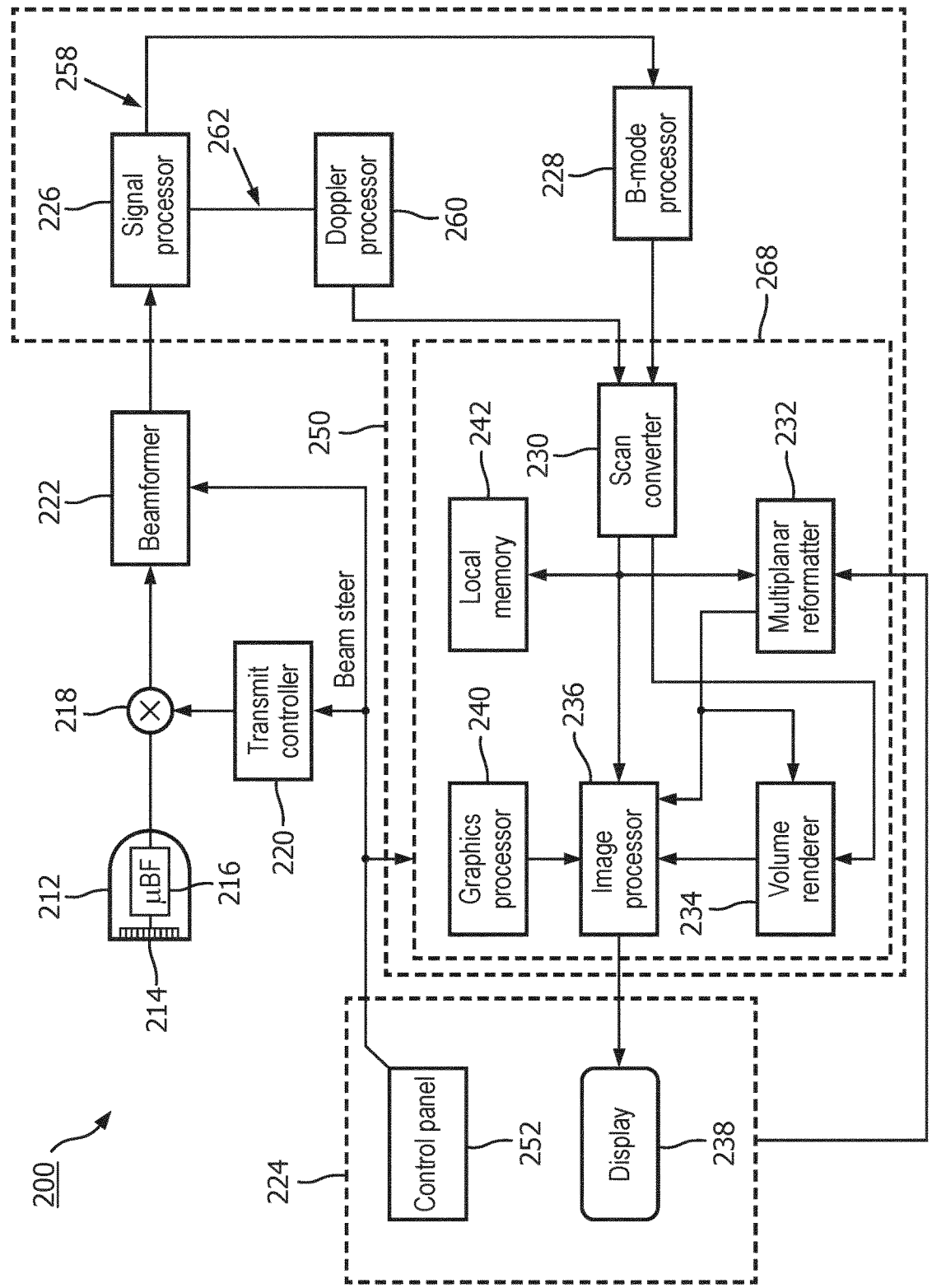
FIG. 2 is a block diagram of an ultrasound imaging system arranged in accordance with examples of the present disclosure.

FIG. 2 shows a block diagram of an ultrasound imaging system 200 constructed in accordance with the principles of the present disclosure. An ultrasound imaging system 200 according to the present disclosure may include a transducer array 214, which may be included in an ultrasound probe 212, for example an external probe or an internal probe such as an intravascular ultrasound (IVUS) catheter probe. In other examples, the transducer array 214 may be in the form of a flexible array configured to be conformally applied to a surface of subject to be imaged (e.g., patient). The transducer array 214 is configured to transmit ultrasound signals (e.g., beams, waves) and receive echoes (e.g., received ultrasound signals) responsive to the transmitted ultrasound signals. A variety of transducer arrays may be used, e.g., linear arrays, curved arrays, or phased arrays. The transducer array 214, for example, can include a two dimensional array (as shown) of transducer elements capable of scanning in both elevation and azimuth dimensions for 2D and/or 3D imaging. As is generally known, the axial direction is the direction normal to the face of the array (in the case of a curved array the axial directions fan out), the azimuthal direction is defined generally by the longitudinal dimension of the array, and the elevation direction is transverse to the azimuthal direction.

In some examples, the transducer array 214 may be coupled to a microbeamformer 216, which may be located in the ultrasound probe 212, and which may control the transmission and reception of signals by the transducer elements in the array 214. In some examples, the microbeamformer 216 may control the transmission and reception of signals by active elements in the array 214 (e.g., an active subset of elements of the array that define the active aperture at any given time).

In some examples, the microbeamformer 216 may be coupled, e.g., by a probe cable or wirelessly, to a transmit/receive (T/R) switch 218, which switches between transmission and reception and protects the main beamformer 222 from high energy transmit signals. In some examples, for example in portable ultrasound systems, the T/R switch 218 and other elements in the system can be included in the ultrasound probe 212 rather than in the ultrasound system base, which may house the image processing electronics. An ultrasound system base typically includes software and hardware components including circuitry for signal processing and image data generation as well as executable instructions for providing a user interface.

The transmission of ultrasonic signals from the transducer array 214 under control of the microbeamformer 216 is directed by the transmit controller 220, which may be coupled to the T/R switch 218 and a main beamformer 222. The transmit controller 220 may control the direction in which beams are steered. Beams may be steered straight ahead from (orthogonal to) the transducer array 214, or at different angles for a wider field of view. The transmit controller 220 may also be coupled to a user interface 224 and receive input from the user's operation of a user input device (e.g., user control). The user interface 224 may include one or more input devices such as a control panel 252, which may include one or more mechanical controls (e.g., buttons, sliders, etc.), touch sensitive controls (e.g., a trackpad, a touchscreen, or the like), and/or other known input devices.

In some examples, the partially beamformed signals produced by the microbeamformer 216 may be coupled to a main beamformer 222 where partially beamformed signals from individual patches of transducer elements may be combined into a fully beamformed signal. In some examples, microbeamformer 216 is omitted. In these examples, the transducer array 214 is under the control of the main beamformer 222, and the main beamformer 222 performs all beamforming of signals. In examples with and without the microbeamformer 216, the beamformed signals of the main beamformer 222 are coupled to processing circuitry 250, which may include one or more processors (e.g., a signal processor 226, a B-mode processor 228, a Doppler processor 260, and one or more image generation and processing components 268) configured to produce an ultrasound image from the beamformed signals (i.e., beamformed RF data).

The signal processor 226 may be configured to process the received beamformed RF data in various ways, such as bandpass filtering, decimation, I and Q component separation, and harmonic signal separation. The signal processor 226 may also perform additional signal enhancement such as speckle reduction, signal compounding, and electronic noise elimination. The processed signals (also referred to as I and Q components or IQ signals) may be coupled to additional downstream signal processing circuits for image generation. The IQ signals may be coupled to a plurality of signal paths within the system, each of which may be associated with a specific arrangement of signal processing components suitable for generating different types of image data (e.g., B-mode image data, Doppler image data). For example, the system may include a B-mode signal path 258 which couples the signals from the signal processor 226 to a B-mode processor 228 for producing B-mode image data.

The B-mode processor 228 can employ amplitude detection for the imaging of structures in the body. The B-mode processor 228 may generate signals for tissue images and/or contrast images. The signals produced by the B-mode processor 228 may be coupled to a scan converter 230 and/or a multiplanar reformatter 232. The scan converter 230 may be configured to arrange the echo signals from the spatial relationship in which they were received to a desired image format. For instance, the scan converter 230 may arrange the echo signal into a two dimensional (2D) sector-shaped format, or a pyramidal or otherwise shaped three dimensional (3D) format.

In some examples, the system may include a Doppler signal path 262 which couples the output from the signal processor 226 to a Doppler processor 260. The Doppler processor 260 may be configured to estimate the Doppler shift and generate Doppler image data. The Doppler image data may include color data which is then overlaid with B-mode (i.e. grayscale) image data for display. The Doppler processor 260 may be configured to filter out unwanted signals (i.e., noise or clutter associated with non-moving tissue), for example using a wall filter. The Doppler processor 260 may be further configured to estimate velocity and power in accordance with known techniques. For example, the Doppler processor may include a Doppler estimator such as an auto-correlator, in which velocity (Doppler frequency) estimation is based on the argument of the lag-one autocorrelation function (e.g., R1) and Doppler power estimation is based on the magnitude of the lag-zero autocorrelation function (e.g., R0). The velocity estimations may be referred to as color Doppler data and the power estimations may be referred to as power Doppler data. Motion can also be estimated by known phase-domain (for example, parametric frequency estimators such as MUSIC, ESPRIT, etc.) or time-domain (for example, cross-correlation) signal processing techniques. Other estimators related to the temporal or spatial distributions of velocity such as estimators of acceleration or temporal and/or spatial velocity derivatives can be used instead of or in addition to velocity estimators. In some examples, the velocity and power estimates (e.g., the color and power Doppler data) may undergo further threshold detection to further reduce noise, as well as segmentation and post-processing such as filling and smoothing. The velocity and/or power estimates may then be mapped to a desired range of display colors and/or intensities in accordance with one or more color and/or intensity maps. The map data, also referred to as Doppler image data, may then be coupled to the scan converter 230, where the Doppler image data may be converted to the desired image format to form a color Doppler or a power Doppler image.

The multiplanar reformatter 232 can convert echoes which are received from points in a common plane (e.g., slice) in a volumetric region of the body into an ultrasonic image (e.g., a B-mode image) of that plane, for example as described in U.S. Pat. No. 6,443,896 (Detmer). In some examples, the user interface 224 may be coupled to the multiplanar reformatter 232 for selection and control of a display of multiple multiplanar reformatted (MPR) images. In other words, a user may select a desired plane within the volume from which to generate a 2D image. In some examples, in addition to selecting a location and/or orientation of the plane in the volume, the user may also select a thickness of the plane. In some examples, the plane data of the multiplanar reformatter 232 may be provided to a volume renderer 234. The volume renderer 234 may generate an image (also referred to as a projection, 3D scene, or rendering) of the 3D dataset as viewed from a given reference point, for example as described in U.S. Pat. No. 6,530,885 (Entrekin et al.). In some examples, while the image generated by the volume renderer 234 is based on a volume (e.g., 3D data set), which may include voxels, the final image rendered by the volume renderer 234 may be a 2D dataset (e.g., 2D image) that includes pixels. The 2D image may then be displayed on a conventional display (e.g., liquid crystal display).

According to examples of the present disclosure, the volume renderer 234 may receive a 2D image from the scan converter 230 and/or the multiplanar reformatter 232. The 2D image includes a 2D dataset including pixels with intensity and/or color values. The volume renderer 234 may transform the 2D dataset into a 3D dataset. In some examples, the 3D data set may include voxels defining a volume. Material properties (e.g., density, absorption, scattering) may be assigned to each voxel in the 3D dataset. The volume renderer 234 may generate a rendered 2D image from the 3D dataset from a viewing plane of a virtual viewer observing the 3D data set from an angle orthogonal to the imaging plane of the 2D image. The volume renderer 234 may simulate at least one light source when generating the rendered 2D image. In some examples, the light source may be at a same location as the virtual observer. In other examples, the light source may be at a different location. Optionally, in some examples, the volume renderer 234 may assign colors to the voxels in the 3D dataset based on the depth and/or intensity value of the voxels.

Output from the scan converter 230 (e.g., B-mode images, Doppler images), the multiplanar reformatter 232, and/or the volume renderer 234 (e.g., volumes, rendered 2D images) may be coupled to an image processor 236 for further enhancement, buffering and temporary storage before being displayed on an image display 238. In some examples, a Doppler image may be overlaid on a B-mode image of the tissue structure by the scan converter 230 and/or image processor 236 for display.

A graphics processor 240 may generate graphic overlays for display with the images. These graphic overlays may contain, for example, standard identifying information such as patient name, date and time of the image, imaging parameters, and the like. For these purposes the graphics processor 240 may be configured to receive input from the user interface 224, such as a typed patient name or other annotations The system 200 may include local memory 242. Local memory 242 may be implemented as any suitable non-transitory computer readable medium (e.g., flash drive, disk drive). Local memory 242 may store data generated by the system 200 including images, 3D models, executable instructions, inputs provided by a user via the user interface 224, or any other information necessary for the operation of the system 200.

As mentioned previously system 200 includes user interface 224. User interface 224 may include display 238 and control panel 252. The display 238 may include a display device implemented using a variety of known display technologies, such as LCD, LED, OLED, or plasma display technology. In some examples, display 238 may comprise multiple displays. The control panel 252 may be configured to receive user inputs (e.g., desired image plane, desired light source, etc.). The control panel 252 may include one or more hard controls (e.g., buttons, knobs, dials, encoders, mouse, trackball or others). In some examples, the control panel 252 may additionally or alternatively include soft controls (e.g., GUI control elements or simply, GUI controls) provided on a touch sensitive display. In some examples, display 238 may be a touch sensitive display that includes one or more soft controls of the control panel 252.

In some examples, various components shown in FIG. 2 may be combined. For instance, image processor 236 and graphics processor 240 may be implemented as a single processor. In another example, the Doppler processor 260 and B-mode processor 228 may be implemented as a single processor. In some examples, various components shown in FIG. 2 may be implemented as separate components. For example, signal processor 226 may be implemented as separate signal processors for each imaging mode (e.g., B-mode, Doppler). In some examples, one or more of the various processors shown in FIG. 2 may be implemented by general purpose processors and/or microprocessors configured to perform the specified tasks. In some examples, one or more of the various processors may be implemented as application specific circuits. In some examples, one or more of the various processors (e.g., image processor 236) may be implemented with one or more graphical processing units (GPU).

Figure 3:
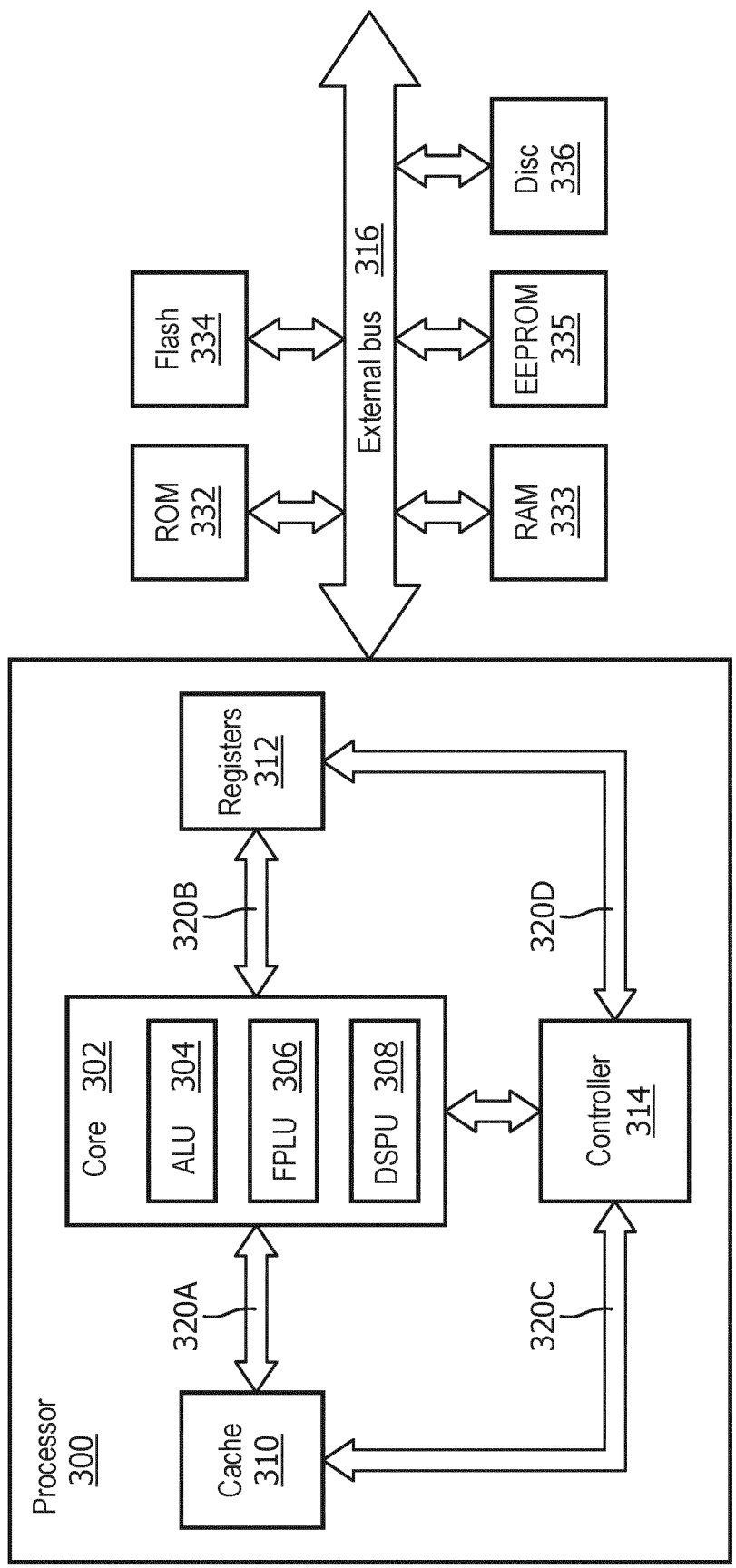
FIG. 3 is a block diagram illustrating an example processor in accordance with examples of the present disclosure.

FIG. 3 is a block diagram illustrating an example processor 300 according to principles of the present disclosure. Processor 300 may be used to implement one or more processors described herein, for example, image processor 236 shown in FIG. 2. Processor 300 may be any suitable processor type including, but not limited to, a microprocessor, a microcontroller, a digital signal processor (DSP), a field programmable array (FPGA) where the FPGA has been programmed to form a processor, a graphical processing unit (GPU), an application specific circuit (ASIC) where the ASIC has been designed to form a processor, or a combination thereof.

The processor 300 may include one or more cores 302. The core 302 may include one or more arithmetic logic units (ALU) 304. In some examples, the core 302 may include a floating point logic unit (FPLU) 306 and/or a digital signal processing unit (DSPU) 308 in addition to or instead of the ALU 304.

The processor 300 may include one or more registers 312 communicatively coupled to the core 302. The registers 312 may be implemented using dedicated logic gate circuits (e.g., flip-flops) and/or any memory technology. In some examples the registers 312 may be implemented using static memory. The register may provide data, instructions and addresses to the core 302.

In some examples, processor 300 may include one or more levels of cache memory 310 communicatively coupled to the core 302. The cache memory 310 may provide computer-readable instructions to the core 302 for execution. The cache memory 310 may provide data for processing by the core 302. In some examples, the computer-readable instructions may have been provided to the cache memory 310 by a local memory, for example, local memory attached to the external bus 416. The cache memory 310 may be implemented with any suitable cache memory type, for example, metal-oxide semiconductor (MOS) memory such as static random access memory (SRAM), dynamic random access memory (DRAM), and/or any other suitable memory technology.

The processor 300 may include a controller 314, which may control input to the processor 300 from other processors and/or components included in a system (e.g., control panel 252 and scan converter 230 shown in FIG. 2) and/or outputs from the processor 300 to other processors and/or components included in the system (e.g., display 238 and volume renderer 234 shown in FIG. 2). Controller 314 may control the data paths in the ALU 304, FPLU 306 and/or DSPU 308. Controller 314 may be implemented as one or more state machines, data paths and/or dedicated control logic. The gates of controller 314 may be implemented as standalone gates, FPGA, ASIC or any other suitable technology.

The registers 312 and the cache memory 310 may communicate with controller 314 and core 302 via internal connections 320A, 320B, 320C and 320D. Internal connections may implemented as a bus, multiplexor, crossbar switch, and/or any other suitable connection technology.

Inputs and outputs for the processor 300 may be provided via a bus 316, which may include one or more conductive lines. The bus 316 may be communicatively coupled to one or more components of processor 300, for example the controller 314, cache memory 310, and/or register 312. The bus 316 may be coupled to one or more components of the system, such as display 238 and control panel 252 mentioned previously.

The bus 316 may be coupled to one or more external memories. The external memories may include Read Only Memory (ROM) 332. ROM 332 may be a masked ROM, Electronically Programmable Read Only Memory (EPROM) or any other suitable technology. The external memory may include Random Access Memory (RAM) 333. RAM 333 may be a static RAM, battery backed up static RAM, Dynamic RAM (DRAM) or any other suitable technology. The external memory may include Electrically Erasable Programmable Read Only Memory (EEPROM) 335. The external memory may include Flash memory 334. The external memory may include a magnetic storage device such as disc 336. In some examples, the external memories may be included in a system, such as ultrasound imaging system 200 shown in FIG. 2, for example local memory 242.

The functions performed by a volume renderer, such as volume renderer 234, to generate a rendered 2D image in accordance with examples of the present disclosure will now be described in more detail with reference to the following figures.

Figure 4:
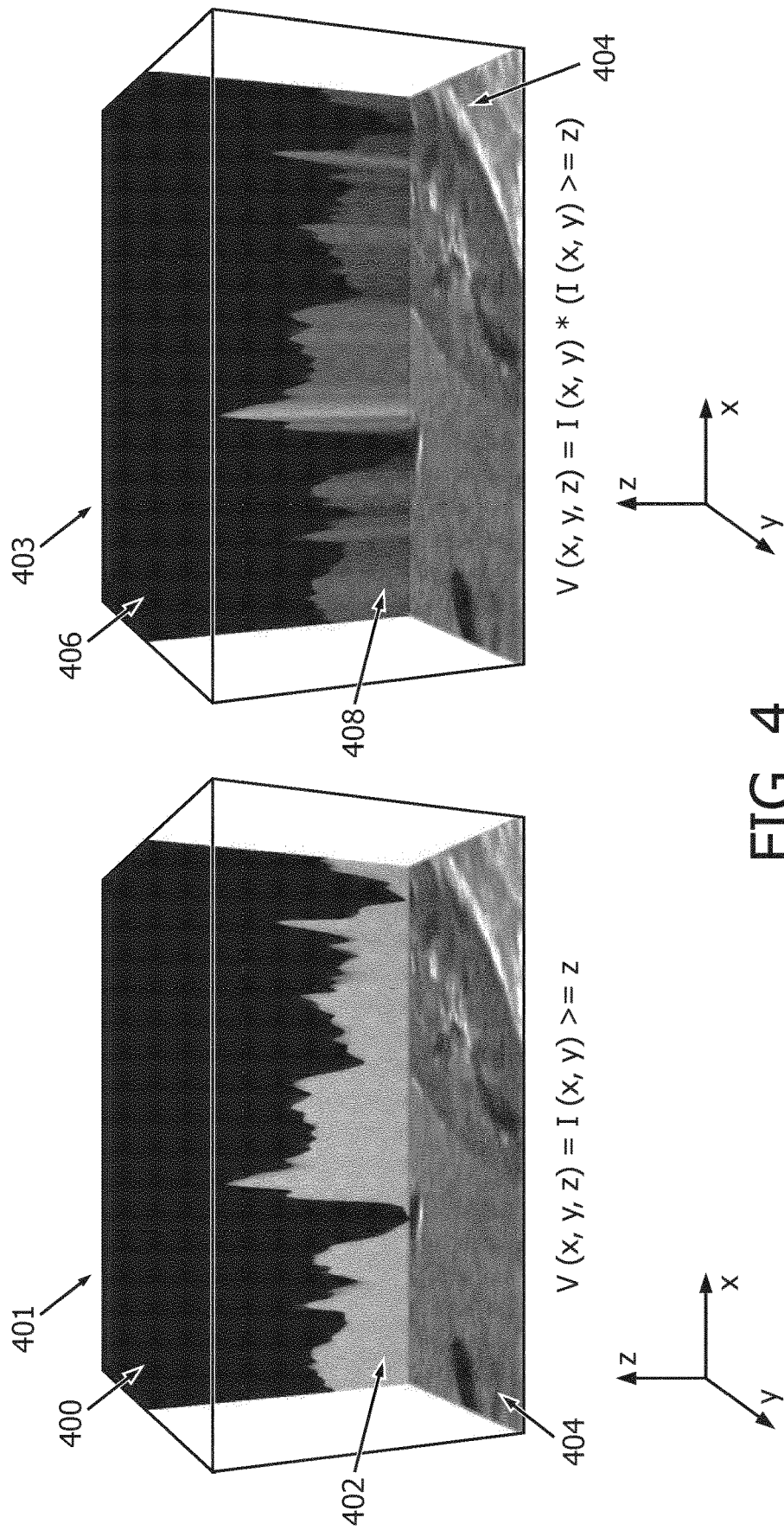
FIG. 4 shows examples of transforming a 2D image into a three dimensional (3D) volume in accordance with examples of the present disclosure.

FIG. 4 shows examples of transforming a 2D image (e.g., a 2D dataset) into a 3D volume (e.g., 3D dataset) in accordance with examples of the present disclosure. Values on a discrete pixel grid I(x,y) of the 2D image are used to generate a 3D volume V(x,y,z), defined on a 3D voxel grid, where x, y are the dimensions of a plane (e.g., length and width) and z is the height of the volume. While the examples provided herein use scalar-valued images, the approach can also be used with multi-channel images by creating one volume per channel.

In a first example approach 401, volume 400 can be filled with binary values 402, where intensity of the pixels of the 2D image 404 is interpreted as the height of a solid object surface at each point corresponding to the pixel. This approach generates a binary height volume 400 and may be described by the equation:

$$V(x,y,z)=I(x,y)\geq z \qquad \text{Equation 1}$$

The representation generated by Equation 1 may be similar in principle to surface shading methods described in reference to FIG. 1, however, this first example approach 401 may enable at least some volumetric effects during generation of the rendered 2D image.

In a second example approach 403, the volume 406 may be filled with image-dependent values. For instance, volume 406 may be built as a stack of identical repeated 2D images 404, or any function of image value and height. This may be described by the equation:

$$V(x,y,z)=I(x,y)\times I(x,y)\geq z \qquad \text{Equation 2}$$

The second approach 403 may provide more flexibility for assigning material properties and generating the rendered 2D image in some applications. Optionally, Equation 2 may be modified such that the values assigned to the voxels based on the intensity of the pixels of the 2D image 404 decay with height. For example, if density is assigned to the voxels, then the density may decrease as z increases. In some examples, whether the first approach 401 or approach 403 is used may be based, at least in part, on a user input provided via a user interface (e.g., user interface 224).

Figure 5:
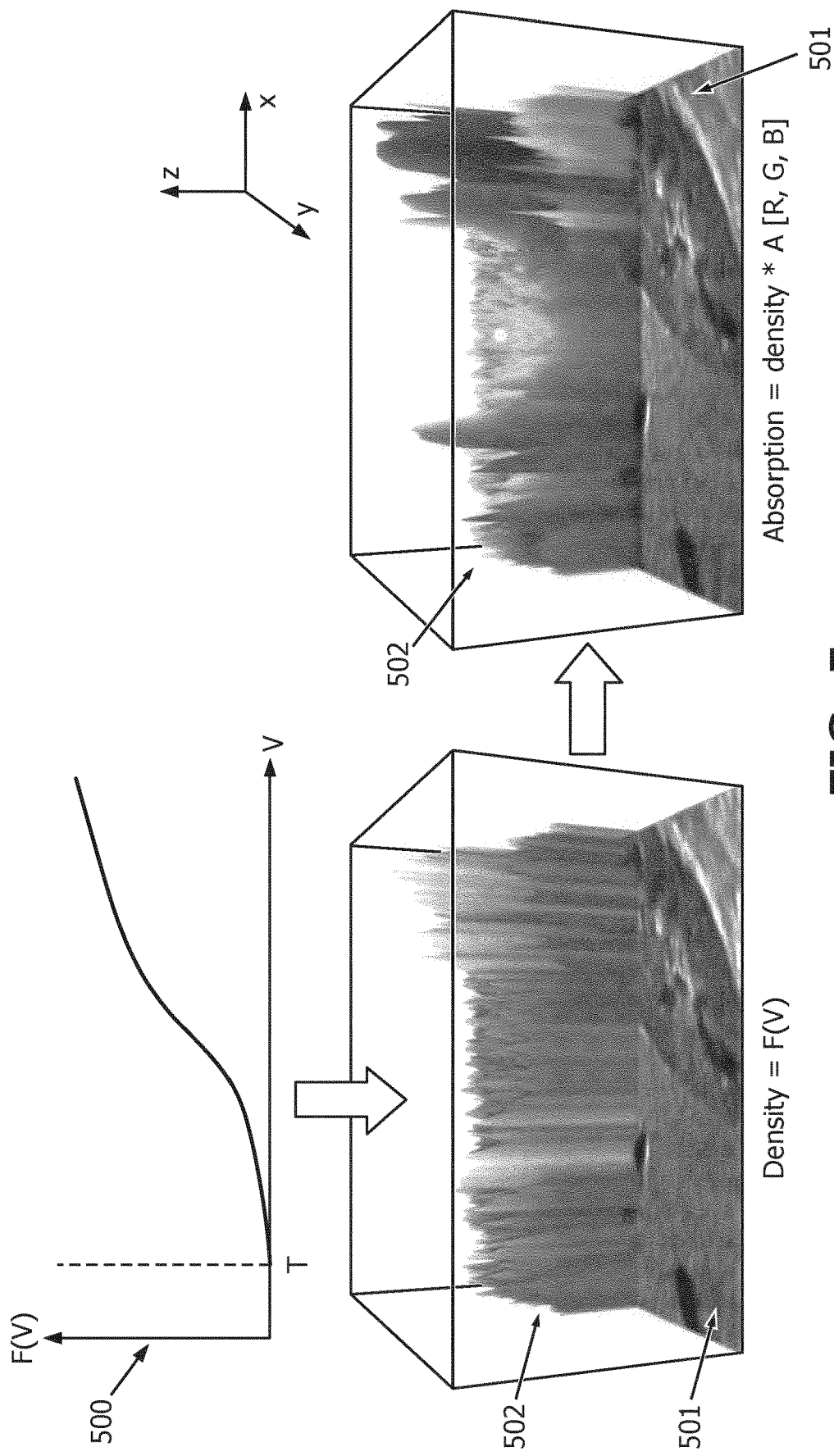
FIG. 5 illustrates assigning material properties to voxels in a volume in accordance with examples of the present disclosure.

FIG. 5 illustrates assigning material properties to voxels in a volume in accordance with examples of the present disclosure. The voxel values V(x,y,z) defined during generation of the 3D dataset as described with reference to FIG. 4 may be mapped to optical material properties. These physically-based properties may define how lighting calculations will be affect any given voxel in subsequent rendering steps. Material properties selected may depend on the choice of a particular volume renderer in some applications. The material properties assigned to each voxel may be represented by one or more transfer functions.

For photo-realistic materials, properties assigned to the voxels may include the density (e.g., opacity) of the material, absorption, scattering, and/or reflection coefficients. Optionally, the physical phenomena of light-matter interaction dependence on light frequency can be modelled by defining these coefficients in the red-green-blue (RGB) space. In other words, the coefficients may vary based on the color (e.g., wavelength) of the light. For example, a wavelength-dependent absorption effect may be chosen to add color to light propagation during rendering.

Plot 500 shows an example of a scalar transfer function controlling the material density by mapping the intensity of a voxel V(x,y,z) of a volume 502 via a transfer function F(V) so that density is equal to F(V). Note that the density assigned to the voxels may be based, at least in part, on the intensity in the original 2D image 501 as the values of V(x,y,z) were based on I(x,y) as discussed in reference to FIG. 4. In some examples, the transfer function may include a threshold value T in some examples. Voxels having values below the threshold value T will be rendered as transparent. Including a threshold value may reduce noise in some examples.

A RGB absorption coefficient A[R, G, B] may be defined. If wavelength-dependent effects are desired, the R, G, B factors may be different values (e.g., may not be equal). For example, to mimic tissue-like appearance for which red light is less absorbed than other frequencies, the R value for the absorption coefficient may be less than the G and B coefficients. The overall absorption may be obtained by multiplying the scalar density F(V) by the coefficient value for each color in the absorption coefficient A[R, G, B]. Thus, both density and absorption coefficients may be assigned to each voxel in volume 502.

While assigning density and absorption coefficients are described herein, these are provided merely as examples and additional material properties may be assigned to the voxels of the 3D dataset (e.g., the volume). For example, to obtain lighting effects such as specular highlights or soft shadows, a similar mapping from voxel values to scattering and reflection properties may be defined. In another example, if a segmentation map of anatomical structures is available for the 2D image, different material properties can be assigned to different regions of the volume, in addition to intensity mapping.

In the case of multi-channel input images, each channel can be used to separately control various parameters, e.g. channel #1 controls height z, #2 density, #3 scattering, etc. Examples of multi-channel inputs include i) different quadrature bandpass (QBP) filter outputs, ii) brightness and coherence images, iii) power, variance, and mean angle of a color sequence, iv) any combination of brightness and one or more tissue properties such as stiffness, attenuation, and/or speed of sound.

Figure 6:
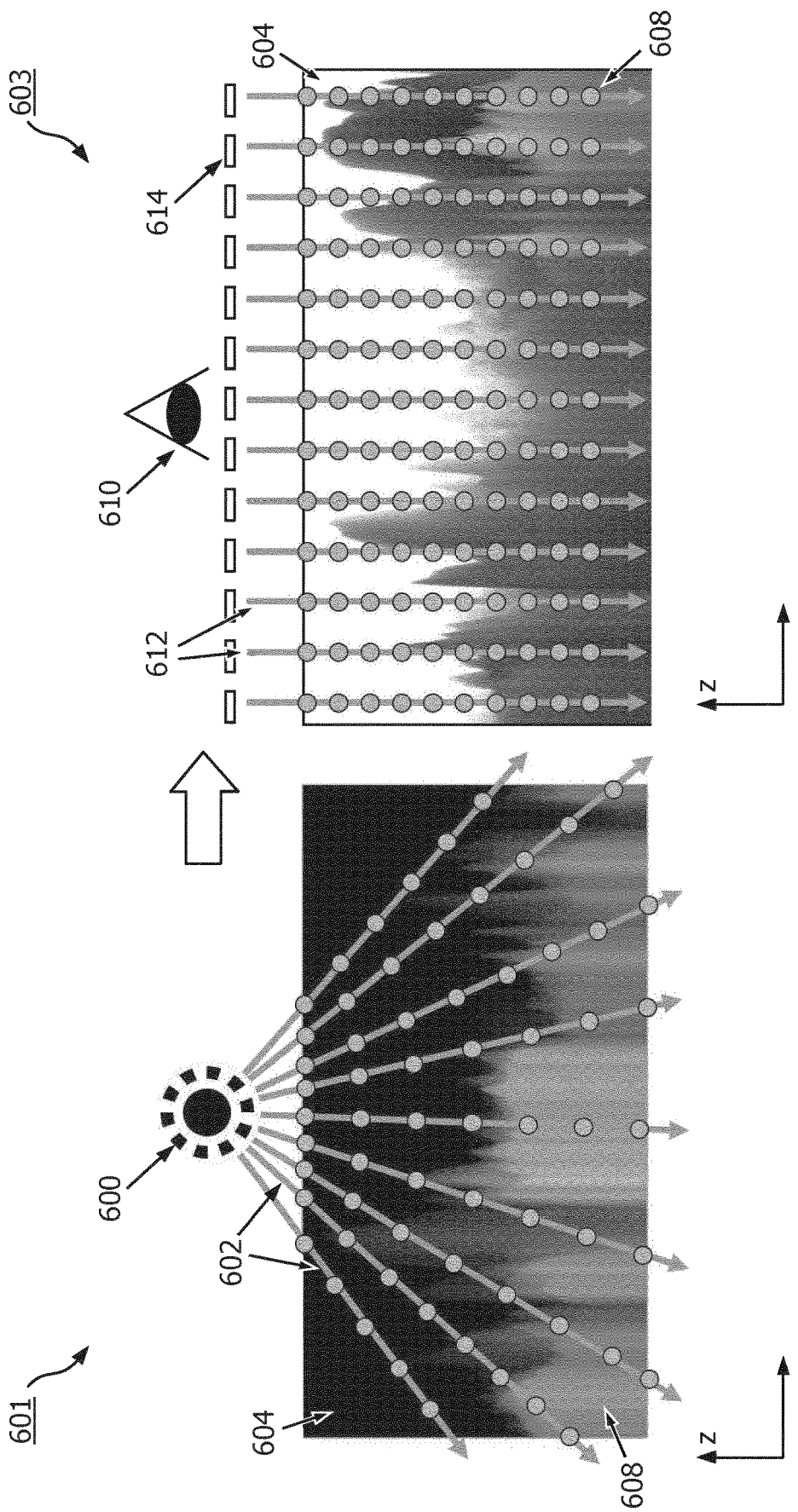
FIG. 6 graphically depicts an example of a two-step rendering in accordance with examples of the present disclosure.

FIG. 6 graphically depicts an example of a two-step rendering in accordance with examples of the present disclosure. In some examples, a 3D scene may be rendered from a voxel volume, generated as described in reference to FIGS. 4 and 5, using a two-step process: a lighting pass and a compositing pass.

In the lighting pass 601, a virtual light source 600 may be simulated by casting light rays 602 through a volume 604. In some examples, such as the one shown in FIG. 6, the light source 600 may be a point source that radiates light rays 602 in all directions. However, in other examples, the light source 600 may be a directed light source (e.g., spotlight, beam). In some examples, the light source 600 may be centered over the volume 604 (e.g., a center point of the x-y coordinates of the volume 604), but in other examples, the light source 600 may be off-centered or off-set from the volume 604 (e.g., the light source 600 may radiate light rays 602 on the volume 604 from a position outside the x-y coordinates of the volume). In some examples, the distance of the light source 600 from the volume 604 (or a distance from a voxel 608 of the volume 604) may be pre-set, or based one or more algorithms (e.g., based on a desired lighting condition, location of detected anatomical structures). In other examples, the distance may be selected by a user input via a user interface, such as user interface 224. In some examples, more than one light source 600 may be used.

In examples where the 2D image used to generate the volume 604 is an ultrasound image, the light source 600 may be positioned such that the location of the light source 600 is at a location where a transducer array that acquired the 2D image was located relative to the 2D image. In some applications, this may permit production of virtual optical shadows that are co-located with acoustic shadows corresponding to the actual ultrasound attenuation.

The light rays 602 are propagated through the volume 604, including the voxels 608. How the light rays 602 interact with the voxels 608 is based, at least in part, on the material properties assigned to the voxels 608. In some examples, the light at each voxel 608 is calculated based on an exponential attenuation model. In some examples, the attenuation model may permit different colors of light (e.g., RGB) to be treated differently by having different absorption coefficients for R, G, and B. For example, the light at each voxel may be provided as:

$$L_{R,G,B}(X) = \exp\left(-A_{R,G,B}\int_{X}^{Light} F(V)ds\right) \quad \text{Equation 3}$$

Where L(X) is the light at a location (e.g., voxel) X. A is the absorption coefficient and F(V) is the density function as discussed with reference to FIG. 5. The light at each location is calculated and stored for use in the compositing pass 603.

In the compositing pass 603, parallel rays 612 are cast from a viewing plane 614 of a virtual viewer 610. To generate a 3D scene that resembles the original 2D image (as opposed to a perspective of a volume), the viewing plane 614 may be parallel to an x-y plane of the volume 604 and the rays 612 may be cast in a direction orthogonal to the x-y plane of the volume 604 (e.g., parallel to the z-axis of the volume). That is, the virtual viewer 610 may be looking straight down at the volume 604. Hence, the rendering may be referred to as a look-down render. In some examples, the virtual viewer 610 may be centered with respect to the volume 604 similar to the virtual light source 600. In some examples, the virtual viewer 610 may be co-located with the virtual light source 600. In some examples, the distance of the viewing plane 614 from the volume 604 may be pre-set or selected by the user via the user interface.

During the compositing pass 603, the final value of the pixels for the rendered 2D image may be computed using a front-to-back RGB compositing scheme computed by ray marching and trilinear volume sampling. The computations are based, at least in part, on the material properties of the voxels 608 and/or the light at each voxel 608 as calculated during the lighting pass 601.

Figure 7:
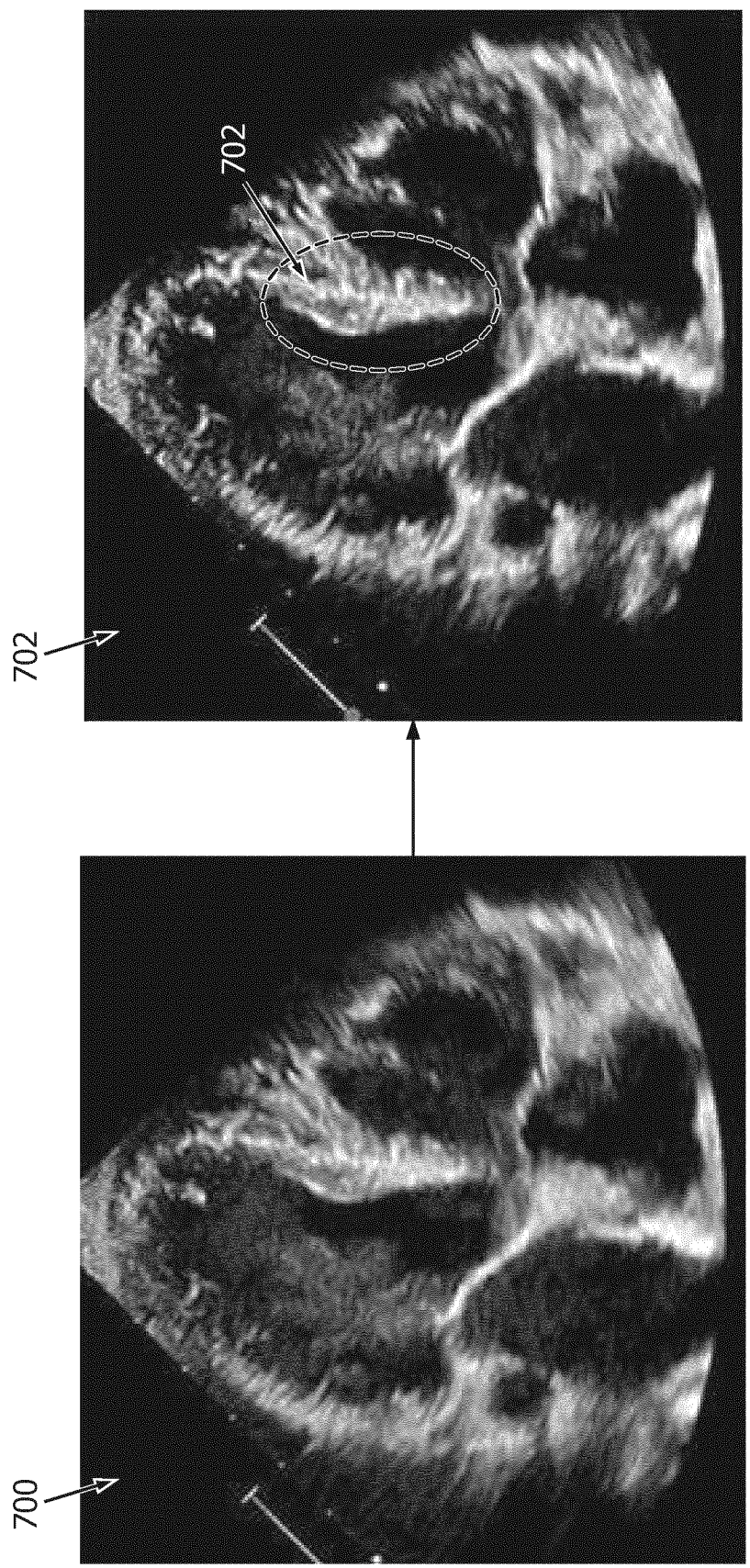
FIG. 7 shows an example 2D image and a corresponding example rendered 2D image in accordance with examples of the present disclosure.

FIG. 7 shows an example 2D image and a corresponding example rendered 2D image in accordance with examples of the present disclosure. The 2D image 700 is a 4-chamber view of a heart acquired with an ultrasound imaging system. A volume dataset was generated based on the image 700 and a 3D scene rendered as described with reference to FIGS. 4-6 to produce the 2D image 702. The look-down rendered 2D image 702 provides shadowing, for example, in region 704 that includes a portion of the wall between the right and left ventricles. The shadowing and increased contrast may provide improved depth perception for some viewers.

Optionally, in some examples, depth-based shading may be performed during the compositing pass. This may further increase contrast in the rendered 2D image in some applications.

Figure 8:
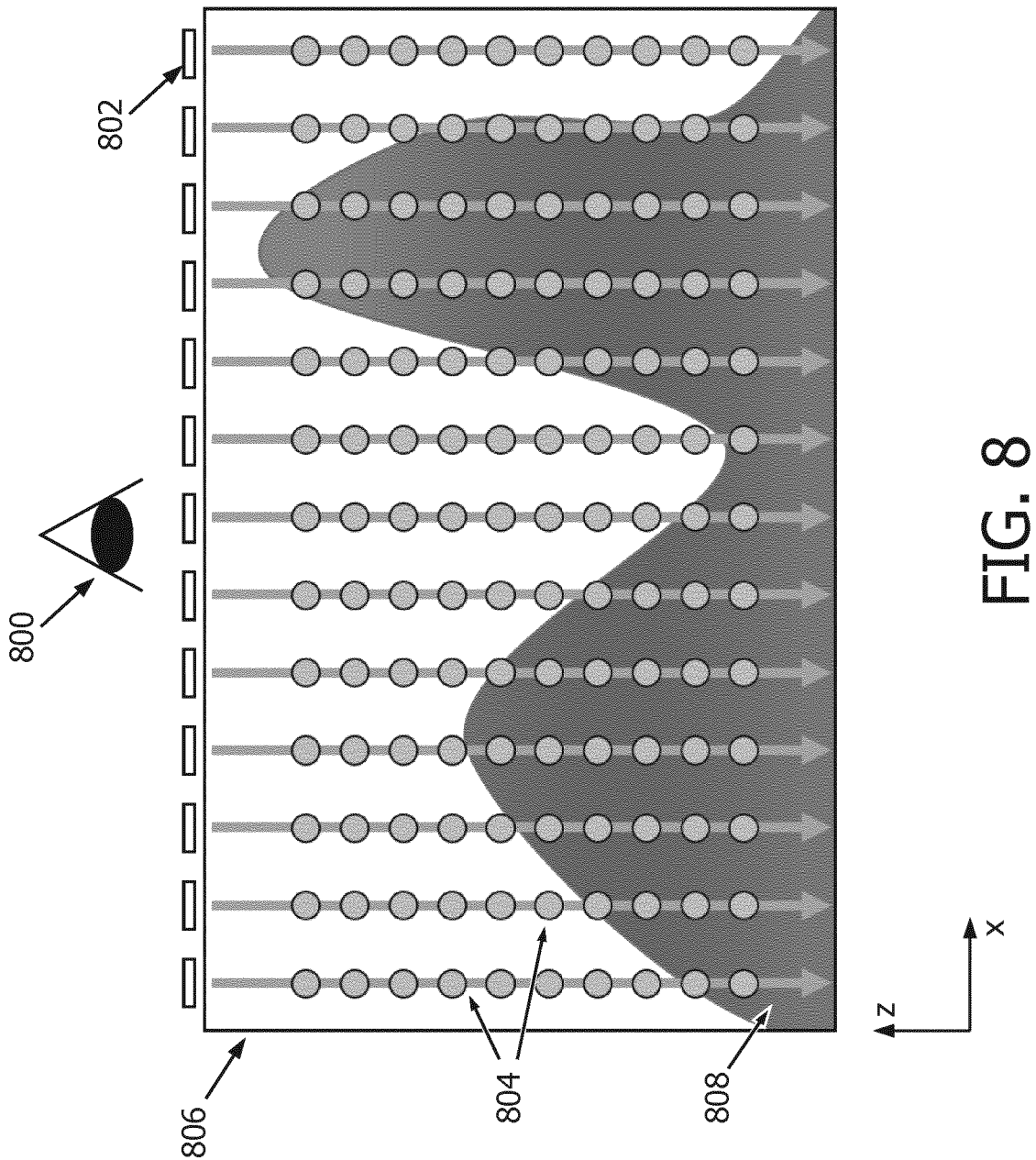
FIG. 8 graphically depicts an example of depth-based shading in accordance with examples of the present disclosure.

FIG. 8 graphically depicts an example of depth-based shading in accordance with examples of the present disclosure. As discussed with reference to FIG. 6, during a compositing pass of a two-step rendering process, parallel rays 804 are propagated through a volume 806 from a viewing plane 802 of a virtual viewer 800. In addition to the material properties and light calculations used during compositing, the hue (e.g., color) of a given voxel 808 may be modified during ray marching based on a distance of that voxel 808 to the viewing plane 802 along the ray 804. For example, voxels 808 closer to the viewing plane 802 may be modified to have a more reddish color while voxels 808 farther from the viewing plane 802 may have a more bluish hue. This is depicted in FIG. 8 as different shading of the voxels 808 through the volume 806. Red and blue are provided only as examples, and other colors may be used. Furthermore, in some examples, more than two colors may be used for depth-dependent modulation of the color of the voxels 808. Note that although the colors of the voxels 808 are height (e.g., z-axis) dependent, in some examples, such as those described in reference to FIG. 4, the height is based on the intensity of the pixels in the 2D image. Thus, the "depth" or "distance" based shading of the voxels 808 may be an indication of signal intensity in the 2D image. The signal intensity may not always correspond to actual physical distance of a point in the 2D image from a viewer. For example, one tissue type may provide stronger signals than another tissue type despite having a same physical distance from a viewer (e.g., same physical distance from a transducer array). Regardless, providing different hues for different intensities may still improve a viewer's ability to interpret the rendered 2D image compared to the original 2D image.

Figure 9:
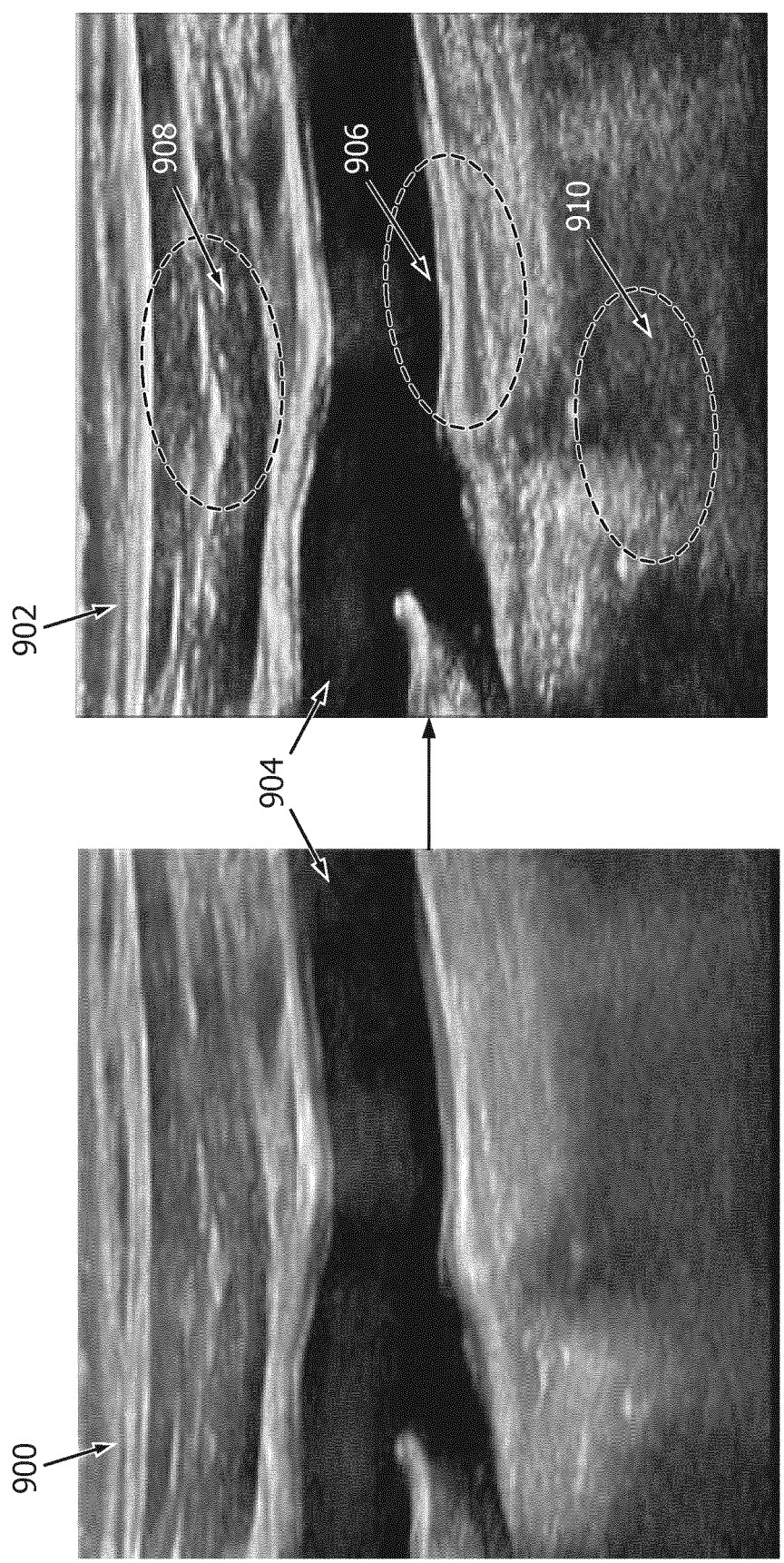
FIG. 9 shows an example 2D image and a corresponding example rendered 2D image in accordance with examples of the present disclosure.

FIG. 9 shows an example 2D image and a corresponding example rendered 2D image in accordance with examples of the present disclosure. The 2D image 900 is a view of a blood vessel 904 and surrounding tissue acquired with an ultrasound imaging system. A volume dataset was generated based on the image 900 and a 3D scene rendered as described with reference to FIGS. 4-6 and FIG. 8 to produce rendered 2D image 902. The in addition to shadowing and contrast (e.g., see region 906), the rendered 2D image 902 provides depth-dependent coloring, for example in regions 908 and 910. The depth-dependent coloring may further enhance the contrast between low and high signal regions for some viewers.

Figure 10:
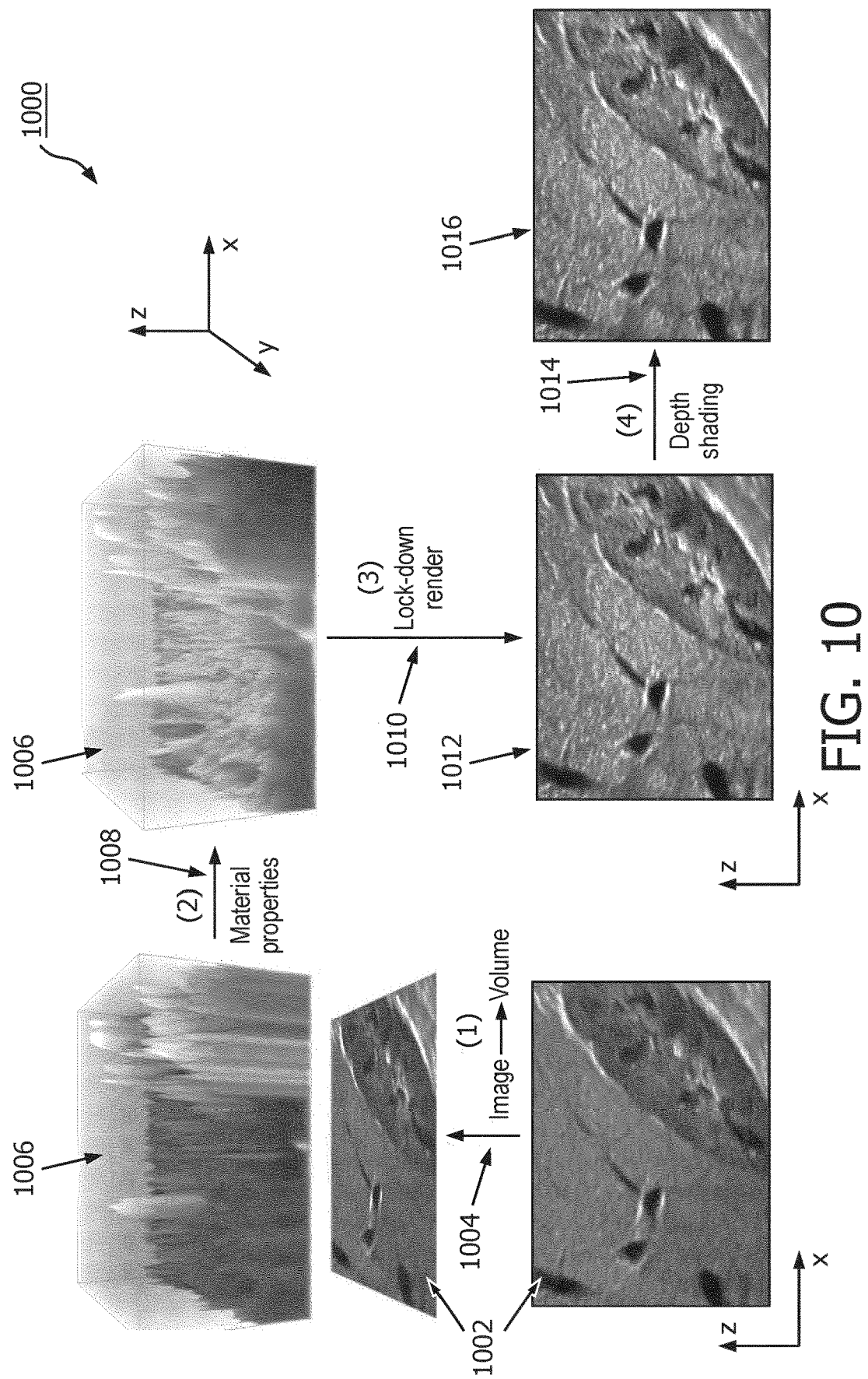
FIG. 10 is a graphical overview of a method in accordance with examples of the present disclosure.

FIG. 10 is a graphical overview of a method in accordance with examples of the present disclosure. In some examples, some or all of the method 1000 may be performed by a volume renderer, such as volume renderer 234 shown in FIG. 2.

The method 1000 may include transforming a two dimensional (2D) dataset 1002 into a three dimensional (3D) dataset 1006 as shown by arrow 1004. In some examples, the 2D dataset 1002 may include pixels (e.g., a medical image) and the 3D dataset 1006 may include voxels. In some examples, the height dimension (z) of the 3D dataset (e.g., the number of voxels extending from the x-y plane) is based, at least in part, on intensity values of the pixels. In some examples, binary values may be assigned to the voxels or values based, at least in part, on the intensity values of the pixels may be assigned to the voxels as discussed with reference to FIG. 4.

The method 1000 may include assigning material properties to the voxels of the volume 1006 as indicated by arrow 1008. As discussed in reference to FIG. 5, in some examples, the material properties may be based, at least in part, on the intensity values of the pixels. In some examples, material properties may be defined based one or more transfer functions. A different transfer function may define each different material property in some examples. In some examples, one or more of the transfer functions may include a threshold value. Voxels that have values below the threshold value may be rendered transparent (e.g., inactive) for that particular material property. In some examples, material properties may include density, absorption, reflectance, and/or scattering. In some examples, one or more of the material properties may be wavelength-dependent. In examples where the 2D dataset is a multichannel dataset, wherein different material properties of the voxels are each based on values from a different channel of the multichannel dataset.

The method 1000 may include rendering a 3D scene of the 3D dataset from a viewing plane parallel to a plane of the 2D dataset to generate a look-down render (e.g., rendered 2D image) 1012 as indicated by arrow 1010. As discussed with reference to FIG. 6, rendering may include simulating at least one virtual light source propagating through the 3D dataset and marching parallel rays through the 3D dataset. How the light propagates through the voxels may be based, at least in part, on the material properties assigned to the voxels. Optionally, in some examples, method 1000 may further include assigning color values to the voxels based, at least in part, on a distance from the voxel to the viewing plane as indicated by arrow 1014. This may generate a rendered 2D image 1016 with enhanced contrast between high intensity signal and low intensity signal areas in some examples.

While the principles of the present disclosure have been described in reference to single 2D images, examples of the present disclosure may extend to blending and fusion of multiple 2D images. For example, multiple B-mode images, harmonic and fundamental images, B-mode and Doppler images, etc.

Figure 11:
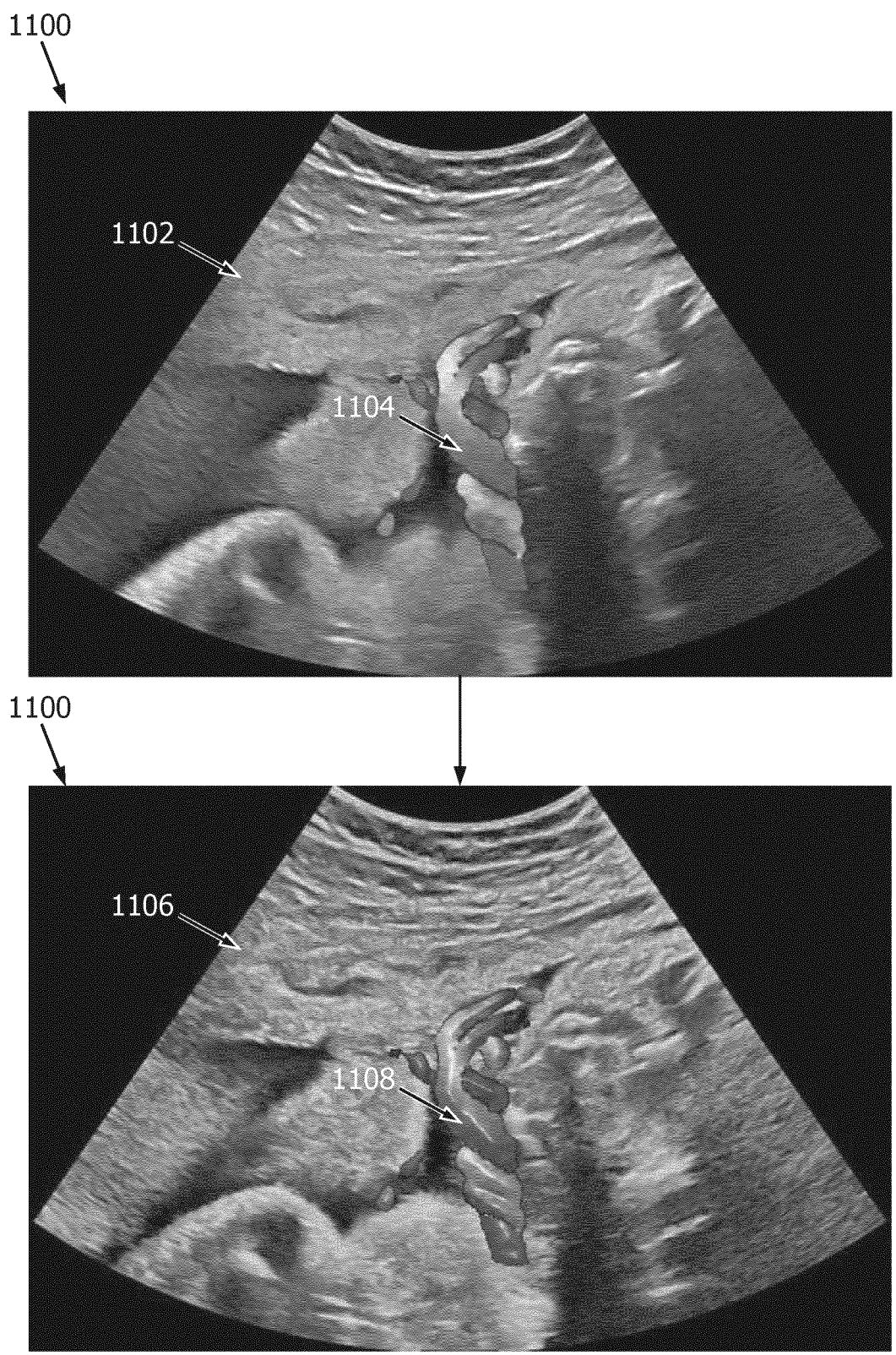
FIG. 11 shows an example of a 2D Doppler image overlaid on a 2D B-mode image and a rendered 2D image incorporating the Doppler and B-mode images in accordance with examples of the present disclosure.

FIG. 11 shows an example of a 2D Doppler image overlaid on a 2D B-mode image and a rendered 2D image incorporating the Doppler and B-mode images in accordance with examples of the present disclosure. Image 1100 depicts a 2D B-mode image 1102 of tissue with a 2D color Doppler image 1104 of blood vessels overlaid on top of the B-mode image 1102. In some examples, separate volumes may be generated for each 2D image as described with reference to FIGS. 4-6 and 10. In other words, a 3D dataset may be generated for B-mode image 1102 and a separate 3D dataset for Doppler image 1104. Material properties may be assigned to the voxels of each 3D dataset independently in some examples. That is, the material properties of the voxels in the 3D dataset for the B-mode image 1102 may not affect the material properties assigned to the voxels of the 3D dataset for the Doppler image 1104. In some examples, the two 3D datasets may be fused in 3D space by simultaneously rendering both 3D datasets under the same lighting conditions in the same 3D scene. In other examples, the two 3D datasets may be blended into a single volume prior to rendering. Image 1110 depicts a rendered 2D image generated from the B-mode image 1102 and the Doppler image 1104. The B-mode portion 1106 of the rendered 2D image 1110 was rendered using optional depth-dependent shading as described with reference to FIG. 8. The Doppler portion 1108 of the rendered 2D image 1110 maintains the velocity color mapping data from the Doppler image 1104.

In some examples, different rendering and/or shading techniques may be used for the different images combined to generate a rendered 2D image. For example, a volume for one image may be generated using the first approach shown in FIG. 4 whereas another volume for a second image may be generated using the second approach shown in FIG. 4. In another example, a first image may be rendered according to examples according to the present disclosure while another image may utilize local surface shading as described with reference to FIG. 1 and overlaid on the rendered 2D image of the first image.

The apparatuses, systems and methods disclosed herein may allow 3D rendering techniques, including photo-realistic rendering techniques, to be applied to 2D images. These techniques may provide 2D images that have more contrast and/or depth perception for viewers compared to traditional 2D images and/or 2D images enhanced with conventional surface enhancement techniques. Although the examples disclosed herein have utilized ultrasound images, the principles of the present disclosure may be applied to other imaging modalities that generate 2D datasets (e.g., X-rays or slices from computed tomography).

In various examples where components, systems and/or methods are implemented using a programmable device, such as a computer-based system or programmable logic, it should be appreciated that the above-described systems and methods can be implemented using any of various known or later developed programming languages, such as "C", "C++", "FORTRAN", "Pascal", "VHDL" and the like. Accordingly, various storage media, such as magnetic computer disks, optical disks, electronic memories and the like, can be prepared that can contain information that can direct a device, such as a computer, to implement the above-described systems and/or methods. Once an appropriate device has access to the information and programs contained on the storage media, the storage media can provide the information and programs to the device, thus enabling the device to perform functions of the systems and/or methods described herein. For example, if a computer disk containing appropriate materials, such as a source file, an object file, an executable file or the like, were provided to a computer, the computer could receive the information, appropriately configure itself and perform the functions of the various systems and methods outlined in the diagrams and flowcharts above to implement the various functions. That is, the computer could receive various portions of information from the disk relating to different elements of the above-described systems and/or methods, implement the individual systems and/or methods and coordinate the functions of the individual systems and/or methods described above.

In view of this disclosure it is noted that the various methods and devices described herein can be implemented in hardware, software, and/or firmware. Further, the various methods and parameters are included by way of example only and not in any limiting sense. In view of this disclosure, those of ordinary skill in the art can implement the present teachings in determining their own techniques and needed equipment to affect these techniques, while remaining within the scope of the invention. The functionality of one or more of the processors described herein may be incorporated into a fewer number or a single processing unit (e.g., a CPU) and may be implemented using application specific integrated circuits (ASICs) or general purpose processing circuits which are programmed responsive to executable instructions to perform the functions described herein.

Although the present apparatuses, systems and methods may have been described with particular reference to an ultrasound imaging system, it is also envisioned that the present system can be extended to other medical imaging systems where one or more images are obtained in a systematic manner. Accordingly, the present system may be used to obtain and/or record image information related to, but not limited to renal, testicular, breast, ovarian, uterine, thyroid, hepatic, lung, musculoskeletal, splenic, cardiac, arterial and vascular systems, as well as other imaging applications related to ultrasound-guided interventions. Further, the present system may also include one or more programs which may be used with conventional imaging systems so that they may provide features and advantages of the present system. Certain additional advantages and features of this disclosure may be apparent to those skilled in the art upon studying the disclosure, or may be experienced by persons employing the novel system and method of the present disclosure. Another advantage of the present systems and method may be that conventional medical image systems can be easily upgraded to incorporate the features and advantages of the present systems, devices, and methods.

Of course, it is to be appreciated that any one of the examples, examples or processes described herein may be combined with one or more other examples, examples and/or processes or be separated and/or performed amongst separate devices or device portions in accordance with the present apparatuses, systems, devices and methods.

Finally, the above-discussion is intended to be merely illustrative of the present systems and methods and should not be construed as limiting the appended claims to any particular example or group of examples. Thus, while the present system has been described in particular detail with reference to exemplary examples, it should also be appreciated that numerous modifications and alternative examples may be devised by those having ordinary skill in the art without departing from the broader and intended spirit and scope of the present systems and methods as set forth in the claims that follow. Accordingly, the specification and drawings are to be regarded in an illustrative manner and are not intended to limit the scope of the appended claims.

What is claimed is:

1. An apparatus comprising:
a processor configured to:
transform a two dimensional (2D) dataset comprising a plurality of pixels into a three dimensional (3D) dataset comprising a plurality of voxels, wherein a plane of the 2D dataset includes a number of voxels of the plurality of voxels corresponding to the plurality of pixels and wherein the plurality of voxels includes additional voxels located out of the plane of the 2D dataset to define a height dimension of the 3D dataset, wherein transforming the 2D dataset into the 3D dataset further comprises assigning values of the height dimension to the plurality of voxels based, at least in part, on intensity values of the plurality of pixels;
assign material properties to the plurality of voxels; and
render a 3D scene of the 3D dataset from a viewing plane parallel to the plane of the 2D dataset, wherein rendering simulates at least one virtual light source propagated through the 3D dataset and propagation of the virtual light source through the 3D dataset is based, at least in part, on the material properties assigned to the plurality of voxels.

2. The apparatus of claim 1, further comprising an ultrasound probe configured to acquire ultrasound signals from a subject, wherein the 2D dataset is generated from the ultrasound signals.

3. The apparatus of claim 2, wherein a location of the simulated light source is based, at least in part, on a location of the ultrasound probe relative to a location where the ultrasound signals were acquired.

4. The apparatus of claim 1, wherein the processor is further configured to assign color values to the plurality of voxels based, at least in part, on a distance from a voxel to the viewing plane.

5. The apparatus of claim 1, further comprising a user interface configured to receive a user input that determines a location of the virtual light source relative to the 3D dataset.

6. A method comprising:
transforming a two dimensional (2D) dataset comprising a plurality of pixels into a three dimensional (3D) dataset comprising a plurality of voxels, wherein a plane of the 2D dataset includes a number of voxels of the plurality of voxels corresponding to the plurality of pixels and wherein the plurality of voxels includes additional voxels located out of the plane of the 2D dataset to define a height dimension of the 3D dataset, wherein transforming the 2D dataset into the 3D dataset further comprises assigning values of the height dimension to the plurality of voxels based, at least in part, on intensity values of the plurality of pixels;
assigning material properties to the plurality of voxels; and
rendering a 3D scene of the 3D dataset from a viewing plane parallel to the plane of the 2D dataset, wherein rendering comprises simulating at least one virtual light source propagated through the 3D dataset and propagation of the virtual light source through the 3D dataset is based, at least in part, on the material properties assigned to the plurality of voxels.

7. The method of claim 6, wherein assigning material properties comprises defining at least one transfer function for at least one material property, or the material properties is wavelength-dependent.

8. The method of claim 7, wherein the transfer function comprises a threshold value, wherein voxels of the plurality of voxels having a value below the threshold value are rendered as transparent for the at least one material property.

9. The method of claim 6, wherein the 2D dataset is a multichannel dataset, wherein different material properties of the plurality of voxels are each based on values from a different channel of the multichannel dataset.

10. The method of claim 6, further comprising assigning color values to the plurality of voxels based, at least in part, on a distance from a voxel to the viewing plane.

11. The method of claim 6, wherein transforming the 2D dataset into the 3D dataset comprises assigning binary values to the plurality of voxels based, at least in part, on intensity values of the plurality of pixels.

12. The method of claim 6, wherein the values assigned to the plurality of voxels decay with height.

13. The method of claim 6, wherein the plurality of pixels of the 2D dataset comprises a first plurality of pixels and a second plurality of pixels and the plurality of voxels of the 3D dataset comprise a first plurality of voxels corresponding to the first plurality of pixels and a second plurality of voxels corresponding to the second plurality of pixels, wherein the first plurality of pixels and the second plurality of pixels correspond to first and second 2D images, respectively.

14. The method of claim 13, wherein the first plurality of voxels is rendered separately from the second plurality of voxels to generate first and second 3D scenes, respectively, wherein the first and second 3D scenes are combined to provide the 3D scene.

* * * * *